United States Patent
Cabrita Condessa et al.

(10) Patent No.: US 12,175,336 B2
(45) Date of Patent: Dec. 24, 2024

(54) SYSTEM AND METHOD FOR UTILIZING PERTURBATION IN A MULTIMODAL ENVIRONMENT

(71) Applicant: Robert Bosch GmbH, Stuttgart (DE)

(72) Inventors: Filipe J. Cabrita Condessa, Pittsburgh, PA (US); Wan-Yi Lin, Wexford, PA (US); Karren Yang, Medford, MA (US); Manash Pratim, Pittsburgh, PA (US)

(73) Assignee: Robert Bosch GmbH (DE)

( * ) Notice: Subject to any disclaimer, the term of this patent is extended or adjusted under 35 U.S.C. 154(b) by 623 days.

(21) Appl. No.: 17/026,258

(22) Filed: Sep. 20, 2020

(65) Prior Publication Data

US 2022/0092466 A1 Mar. 24, 2022

(51) Int. Cl.
*G06N 20/00* (2019.01)
(52) U.S. Cl.
CPC .................... *G06N 20/00* (2019.01)
(58) Field of Classification Search
CPC ........ G06N 20/00; G06N 20/10; G06N 20/20; G06N 5/04; G06N 3/09; G06N 3/08; G06N 3/094
See application file for complete search history.

(56) References Cited

U.S. PATENT DOCUMENTS

| 10,542,034 B1* | 1/2020 | Shintre ............... H04L 63/1441 |
| 10,839,268 B1* | 11/2020 | Ardulov ............... G06V 10/764 |
| 2017/0032222 A1* | 2/2017 | Sharma ................ G06V 10/449 |
| 2021/0064938 A1* | 3/2021 | Ahuja .................... G06N 3/084 |
| 2021/0157911 A1* | 5/2021 | Yu ............................ G06N 3/08 |
| 2022/0365604 A1* | 11/2022 | Arngren ................. G06F 1/163 |

OTHER PUBLICATIONS

Tu et al. "Physically Realizable Adversarial Examples for LiDAR Object Detection", 2020 IEEE/CVF Conference on Computer Vision and Pattern Recognition (CVPR), 10 Pages.
Lee et al. "On Physical Adversarial Patches for Object Detection", arXiv preprint arXiv:1906.11897, Jun. 2019, 5 Pages.

* cited by examiner

*Primary Examiner* — Eric J Yoon
(74) *Attorney, Agent, or Firm* — Dickinson Wright PLLC

(57) ABSTRACT

A computer-implemented method for training a machine learning network. The method may include receiving an input data, selecting one or more batch samples from the input data, applying a perturbation object onto the one or more batch samples to create a perturbed sample, running the perturbed sample through the machine learning network, updating the perturbation object in response to the function in response to running the perturbed sample, and outputting the perturbation object in response to exceeding a convergence threshold.

13 Claims, 9 Drawing Sheets

SYSTEM AND METHOD FOR UTILIZING PERTURBATION IN A MULTIMODAL ENVIRONMENT

TECHNICAL FIELD

The present disclosure relates to augmentation and image processing of an image utilizing machine learning, such as utilization of an autoencoder.

BACKGROUND

Generating physical perturbation objects, either a poster-like patch or a mesh representing the shape of a 3-D object, to suppress the likelihood of objects being detected or classified using single-modal input. The problem of how to generate an object, when attached to the object-of-interest (OOI), increases the likelihood that the OOI will be detected or classified correctly, regardless of how many modalities may be utilized as input to the object detector, has never been done in the literature.

SUMMARY

According to one embodiment, a computer-implemented method for training a machine learning network is disclosed. The method may include receiving an input data, selecting one or more batch samples from the input data, applying a perturbation object onto the one or more batch samples to create a perturbed sample, running the perturbed sample through the machine learning network, updating the perturbation object in response to the derivative of loss function of the machine learning network with respect to input data in response to running the perturbed sample, and outputting the perturbation object in response to exceeding a convergence threshold.

According to a second embodiment, a system including a machine learning network includes an input interface configured to receive input data and a processor in communication with the input interface. The processor is programmed to receive an input data, select one or more batch samples from the input data, apply a perturbation object onto the one or more batch samples to create a perturbed sample, run the perturbed sample through the machine learning network, update the perturbation object in response to the derivative of loss function of the machine learning network with respect to input data in response to running the perturbed sample, and output the perturbation object in response to exceeding a convergence threshold.

According to a third embodiment, a computer-program product storing instructions is disclosed. The instructions, when executed by a computer, cause the computer to receive an input data, select one or more batch samples from the input data, apply a perturbation object onto the one or more batch samples to create a perturbed sample, run the perturbed sample through the machine learning network utilizing a function, train the machine learning network utilizing the function in response to running the perturbed sample, and output a trained machine learning network.

DETAILED DESCRIPTION

Figure 1:
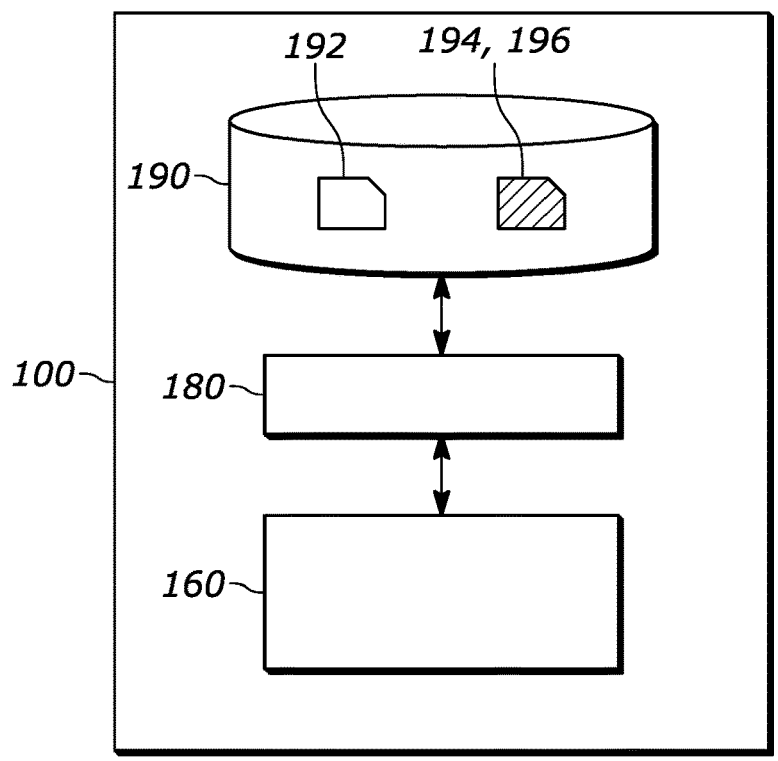
FIG. 1 shows a system 100 for training a neural network.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure utilizes the same or similar fundamental techniques of generating adversarial objects for single-modal object detection systems. However, it may generate a perturbation object to be attached to the object-of-interest ("OOI"), and such object will instead maximize the likelihood of the OOI being detected by existing object detectors or classified correctly by classifiers with single-modal input, as well as maximize the likelihood of the OOI being detected by existing object detectors/classifier with multi-modal input, including scenarios when some input modalities (e.g. various sensor, camera, microphone, or other inputs) are not observed maximize the likelihood of the OOI being detected by multi or single modal object detectors/classifier that are designed and trained to detect the OOI with such object.

As machine learning systems become ubiquitous in the perception stack, a significant amount of effort may be allocated to improving the performance of such systems in the presence of unforeseen scenarios. This disclosure and the embodiments described below pertains to systems and methods to guide the development of OOI through small modifications to its aspect, color, texture, shape, or any other physical characteristics that will influence sensor acquisition and associated machine learning systems to ensure that pre-defined OOI are always detected. The disclosures addresses both single modality and multiple modality scenarios, as well as robustness to less-than-ideal situations where the range of modalities are not available. This disclosure may also address the situation where the OOI is multiple machine learning systems are targeted.

The following paragraph corresponds to a non-limiting example of the application of the disclosure to the co-design of a perturbation to ensure that an object (e.g., a vehicle) will always be detected by a one object detector, multiple object detectors, or classifiers in a single or multiple modality setting. For example, a company may have an object detector or classifier that will be deployed in the real world. To ensure that the object detector or classifier will not miss a vehicle, the company may design a perturbation object that a consumer, supplier, or auto manufacturer can attach to its car, e.g., a targeted universal patch or mesh (targeted to a car class), such that the vehicle will never be missed or mitigate missing such a vehicle. However, in the real world, the object detector or classifier cannot guarantee that the perturbation object will always be visible (it might be possible that another system does not capture the patch). On the other hand, a system might be multimodal (N modalities), or it might be able to operate in 1 single modality. To avoid a vehicle from being misclassified or mis-detected by the system, a multimodal targeted perturbation object may be configured to maximize the likelihood that the vehicle is classified as a car, even if the perturbation is captured in only one modality (e.g., via a single sensor). Such a perturbation can be designed taking in account only Alice's system or multiple and different machine learning systems deployed by different agents.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation, and a part of the input of the stack of layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("IO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
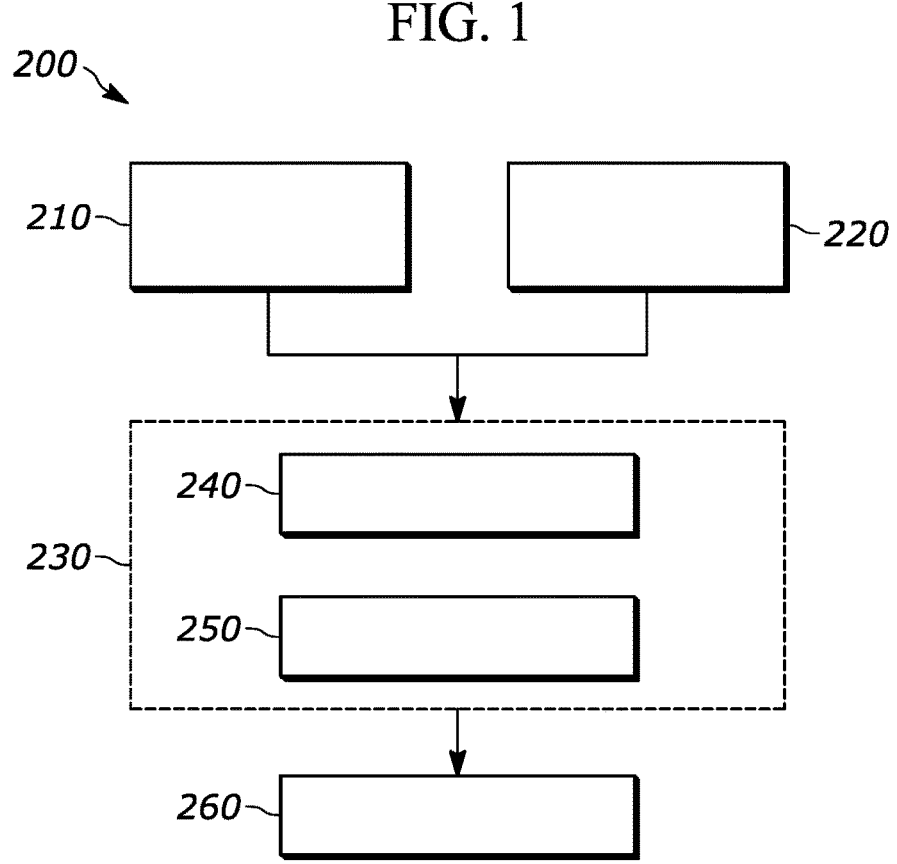
FIG. 2 shows a computer-implemented method 200 for training a neural network.

FIG. 2 shows a computer-implemented method 200 for training a neural network. The method 200 may correspond to an operation of the system 100 of FIG. 1, but does not need to, in that it may also correspond to an operation of another type of system, apparatus or device or in that it may correspond to a computer program. The method 200 is shown to comprise, in a step titled "PROVIDING DATA REPRESENTATION OF NEURAL NETWORK", providing 210 a neural network, wherein the providing of the neural network comprises providing an iterative function as a substitute for a stack of layers of the neural network, wherein respective layers of the stack of layers being substituted have mutually shared weights and receive as input an output of a previous layer, or for a first layer of the stack of layers, an initial activation, and a part of the input of the stack of layers. The method 200 is further shown to comprise, in a step titled "ACCESSING TRAINING DATA", accessing 220 training data for the neural network. The method 200 is further shown to comprise, in a step titled "ITERATIVELY TRAINING NEURAL NETWORK USING TRAINING DATA", iteratively 230 training the neural network using the training data, which training 230 may comprise a forward propagation part and a backward propagation part. Performing the forward propagation part by the method 200 may comprise, in a step titled "DETERMINING EQUILIBRIUM POINT USING ROOT-FINDING ALGORITHM", determining 240 an equilibrium point of the iterative function at which the iterative function converges to a fixed point, wherein determining the equilibrium point comprises using a numerical root-finding algorithm to find a root solution for the iterative function minus its input, and in a step titled "PROVIDING EQUILIBRIUM POINT AS SUBSTITUTE FOR OUTPUT OF STACK OF LAYERS", providing the equilibrium point as a substitute for an output of the stack of layers in the neural network. The method 200 may further comprise, after the training and in a step titled "OUTPUTTING TRAINED NEURAL NETWORK", outputting 260 a trained neural network. The following examples describe the neural network, including the training thereof in which a stack of layers is substituted by an iterative function and in which a root finding algorithm is used to determine an equilibrium point at which the iterative function converges to a fixed point, wherein determining the equilibrium point comprises using a numerical root-finding algorithm to find a root solution for the iterative function minus its input, and in a step titled "PROVIDING EQUILIBRIUM POINT AS A SUBSTITUTE FOR OUTPUT OF STACK OF LAYERS", providing 250 the equilibrium point as a substitute for an output of the stack of layers in the neural network. The method 200 may further comprise, after the training and in a step titled "OUTPUTTING TRAINED NEURAL NETWORK," outputting 260 a trained neural network. The neural network may be further described in the Patent Application titled "DEEP NEURAL NETWORK WITH EQUILIBRIUM SOLVER," having application Ser. No. 16/985,852, which is herein incorporated by reference in its entirety.

Figure 3:
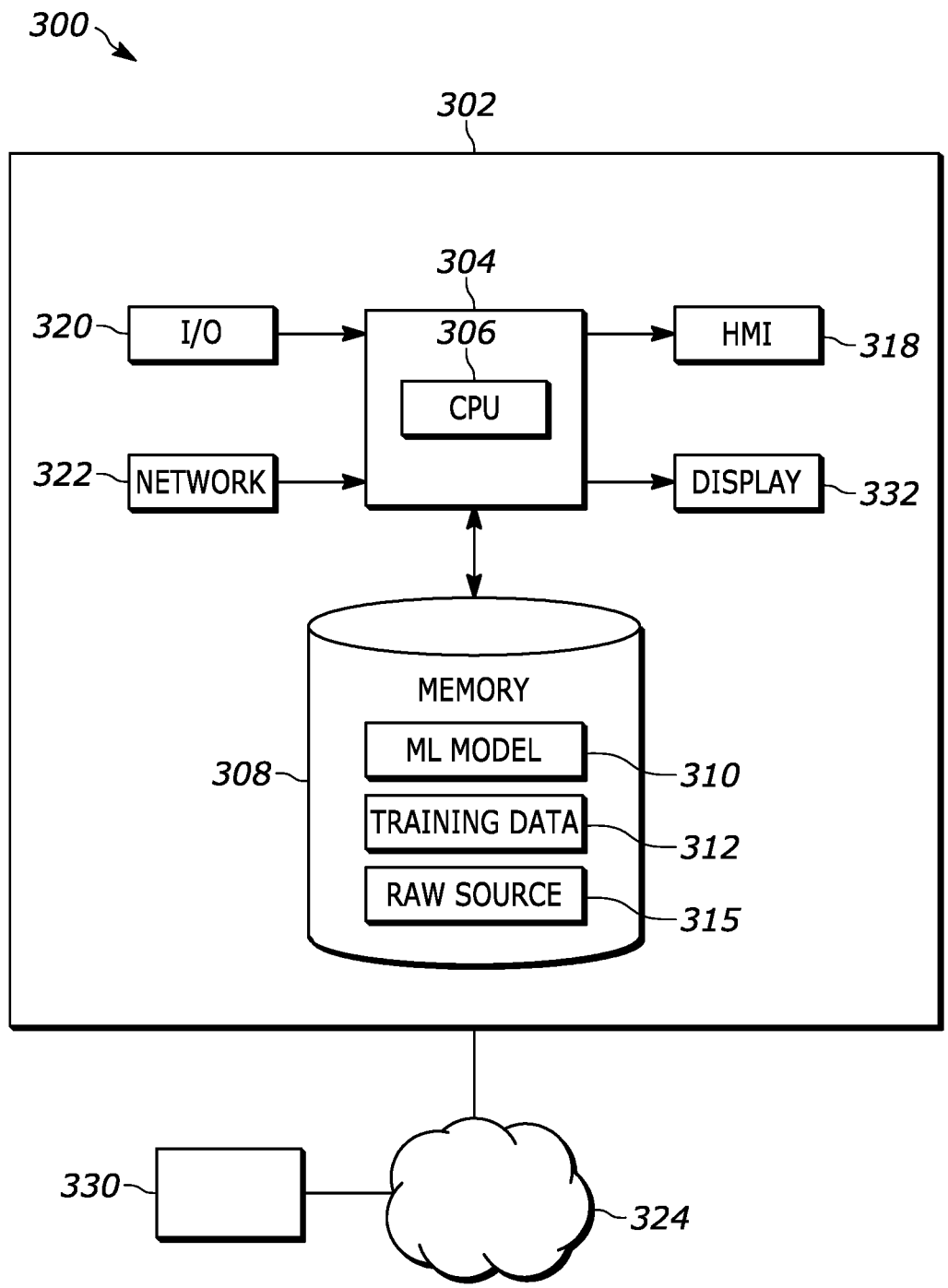
FIG. 3 depicts a data annotation system 300 to implement a system for annotating data.

FIG. 3 depicts a data annotation system 300 to implement a system for annotating data. The data annotation system 300 may include at least one computing system 302. The computing system 302 may include at least one processor 304 that is operatively connected to a memory unit 308. The processor 304 may include one or more integrated circuits that implement the functionality of a central processing unit (CPU) 306. The CPU 306 may be a commercially available processing unit that implements an instruction stet such as one of the x86, ARM, Power, or MIPS instruction set families. During operation, the CPU 306 may execute stored program instructions that are retrieved from the memory unit 308. The stored program instructions may include software that controls operation of the CPU 306 to perform the operation described herein. In some examples, the processor 304 may be a system on a chip (SoC) that integrates functionality of the CPU 306, the memory unit 308, a network interface, and input/output interfaces into a single integrated device. The computing system 302 may implement an operating system for managing various aspects of the operation.

The memory unit 308 may include volatile memory and non-volatile memory for storing instructions and data. The non-volatile memory may include solid-state memories, such as NAND flash memory, magnetic and optical storage media, or any other suitable data storage device that retains data when the computing system 302 is deactivated or loses electrical power. The volatile memory may include static and dynamic random-access memory (RAM) that stores program instructions and data. For example, the memory unit 308 may store a machine-learning model 310 or algorithm, a training dataset 312 for the machine-learning model 310, raw source dataset 315.

The computing system 302 may include a network interface device 322 that is configured to provide communication with external systems and devices. For example, the network interface device 322 may include a wired and/or wireless Ethernet interface as defined by Institute of Electrical and Electronics Engineers (IEEE) 802.11 family of standards. The network interface device 322 may include a cellular communication interface for communicating with a cellular network (e.g., 3G, 4G, 5G). The network interface device 322 may be further configured to provide a communication interface to an external network 324 or cloud.

The external network 324 may be referred to as the world-wide web or the Internet. The external network 324 may establish a standard communication protocol between computing devices. The external network 324 may allow information and data to be easily exchanged between computing devices and networks. One or more servers 330 may be in communication with the external network 324.

The computing system 302 may include an input/output (I/O) interface 320 that may be configured to provide digital and/or analog inputs and outputs. The I/O interface 320 may include additional serial interfaces for communicating with external devices (e.g., Universal Serial Bus (USB) interface).

The computing system 302 may include a human-machine interface (HMI) device 318 that may include any device that enables the system 300 to receive control input. Examples of input devices may include human interface inputs such as keyboards, mice, touchscreens, voice input devices, and other similar devices. The computing system 302 may include a display device 332. The computing system 302 may include hardware and software for outputting graphics and text information to the display device 332. The display device 332 may include an electronic display screen, projector, printer or other suitable device for displaying information to a user or operator. The computing system 302 may be further configured to allow interaction with remote HMI and remote display devices via the network interface device 322.

The system 300 may be implemented using one or multiple computing systems. While the example depicts a single computing system 302 that implements all of the described features, it is intended that various features and functions may be separated and implemented by multiple computing units in communication with one another. The particular system architecture selected may depend on a variety of factors.

The system 300 may implement a machine-learning algorithm 310 that is configured to analyze the raw source dataset 315. The raw source dataset 315 may include raw or unprocessed sensor data that may be representative of an input dataset for a machine-learning system. The raw source dataset 315 may include video, video segments, images, text-based information, and raw or partially processed sensor data (e.g., radar map of objects). In some examples, the machine-learning algorithm 310 may be a neural network algorithm that is designed to perform a predetermined function. For example, the neural network algorithm may be configured in automotive applications to identify pedestrians in video images.

The computer system 300 may store a training dataset 312 for the machine-learning algorithm 310. The training dataset 312 may represent a set of previously constructed data for training the machine-learning algorithm 310. The training dataset 312 may be used by the machine-learning algorithm 310 to learn weighting factors associated with a neural network algorithm. The training dataset 312 may include a set of source data that has corresponding outcomes or results that the machine-learning algorithm 310 tries to duplicate via the learning process. In this example, the training dataset 312 may include source videos with and without pedestrians and corresponding presence and location information. The source videos may include various scenarios in which pedestrians are identified.

The machine-learning algorithm 310 may be operated in a learning mode using the training dataset 312 as input. The machine-learning algorithm 310 may be executed over a number of iterations using the data from the training dataset 312. With each iteration, the machine-learning algorithm 310 may update internal weighting factors based on the achieved results. For example, the machine-learning algorithm 310 can compare output results (e.g., annotations) with those included in the training dataset 312. Since the training dataset 312 includes the expected results, the machine-learning algorithm 310 can determine when performance is acceptable. After the machine-learning algorithm 310 achieves a predetermined performance level (e.g., 100% agreement with the outcomes associated with the training dataset 312), the machine-learning algorithm 310 may be executed using data that is not in the training dataset 312. The trained machine-learning algorithm 310 may be applied to new datasets to generate annotated data.

The machine-learning algorithm 310 may be configured to identify a particular feature in the raw source data 315. The raw source data 315 may include a plurality of instances or input dataset for which annotation results are desired. For example, the machine-learning algorithm 310 may be configured to identify the presence of a pedestrian in video images and annotate the occurrences. The machine-learning algorithm 310 may be programmed to process the raw source data 315 to identify the presence of the particular features. The machine-learning algorithm 310 may be configured to identify a feature in the raw source data 315 as a predetermined feature (e.g., pedestrian). The raw source data 315 may be derived from a variety of sources. For example, the raw source data 315 may be actual input data collected by a machine-learning system. The raw source data 315 may be machine generated for testing the system. As an example, the raw source data 315 may include raw video images from a camera.

In the example, the machine-learning algorithm 310 may process raw source data 315 and output an indication of a representation of an image. The output may also include augmented representation of the image. A machine-learning algorithm 310 may generate a confidence level or factor for each output generated. For example, a confidence value that exceeds a predetermined high-confidence threshold may indicate that the machine-learning algorithm 310 is confident that the identified feature corresponds to the particular feature. A confidence value that is less than a low-confidence threshold may indicate that the machine-learning algorithm 310 has some uncertainty that the particular feature is present.

The system (e.g., machine learning model) may be utilizing a neural network with machine learning models. The a machine learning method $f_\theta$, characterized by parameter set $\theta$, which maps a N-modality input $x \in \{R^{m_1}, \ldots, R^{m_N}\}$, where $m_i$ denotes the dimensionality of the ith modality, to output $y \in R^q$. The modality input may be from a multitude of different sensors, such as a camera, LIDAR sensor, radar sensor, video recorder, microphone, etc. The machine learning model may incorporate a loss function $l(f_\theta(x),y)$ that may measure the performance of the machine learning method on a sample x given the correct prediction y. Thus, the loss function may attempt to reach a convergence state. The system may have a target output class y*. The system may include a training set with associated labeling $\{,Y\}$, where X may denote a set of multimodal data and Y the corresponding labels.

The system may include an observe function o and associated distribution set O reflecting the modalities being observed. An apply function a which applies a perturbation $\delta$ onto an OOI in a sensor measurement x, where in non a limiting way if x corresponds to an image, then $\delta$ could correspond to a patch that would overwrite the measurements of x on the locations where applied. The system may include a transform function t that will reflect transformations to a physical object undergone during signal acquisition, and associated distribution of transform functions T, such that transform functions t drawn from T will include rotation, scaling, and luminance change for image and 3D objects, acoustic channels for acoustic signals, scattering for LIDAR or RADAR or other modalities. Distribution T corresponds to an aggregate of all possible processes of alteration of capture signals x by physical processes.

The perturbation $\delta^*$ can thus designed as $$\delta^* = \underset{\delta}{\mathrm{argmin}}\, E_{x,y \in \{X,Y|y=y^*\}, t \in T, o \in O}[l(f_\theta(o(a(x, t(\delta)))), y^*)]$$

Without loss of generality, the system can consider o(a (x,t($\delta$)) the multimodal sensor measurements of training examples x containing the class of interest y* where the perturbation $\delta$ is transformed by the transform function t, applied on OOI by apply function a, and observed by observe function o.

In a non-limiting way, the set of functions (t, a, o) and associate distributions may define a computational simulation environment that can be deterministic or stochastic. This computational simulation environment can also be obtained by a deep-learning generative system where joint distributions of such functions and transforms can be learnt and applied from multimodal/multi-view datasets.

The process of co-designing the machine learning system $f_\theta$ and the perturbation object $\delta^*$ can be obtained as:

$$\theta^*, \delta^* = \underset{\delta,\theta}{\mathrm{argmin}}\, E_{x,y \in \{X,Y|y=y\}, t \in T, o \in O}[l(f_\theta(o(a(x, t(\delta)))), y^*)] + \lambda E_{x,y \in \{X,Y\}}[l(f_\theta(x, y)]$$

Where $\lambda$ denotes a scalar parameter that denotes the relative importance of co-design of machine learning system and perturbation when compared to the importance of only learning the machine learning system $f_\theta$.

The embodiments of the present disclosure may have two approaches. The first approach may be given a N-modal classifier/object detector $f_\theta$ and corresponding training data $\{X,Y\}$ (e.g., input and location), design a physical perturbation object that maximizes the probability of the object of interest (OOI) being classified/detected correctly, under partial or all modality observations.

Figure 4A:
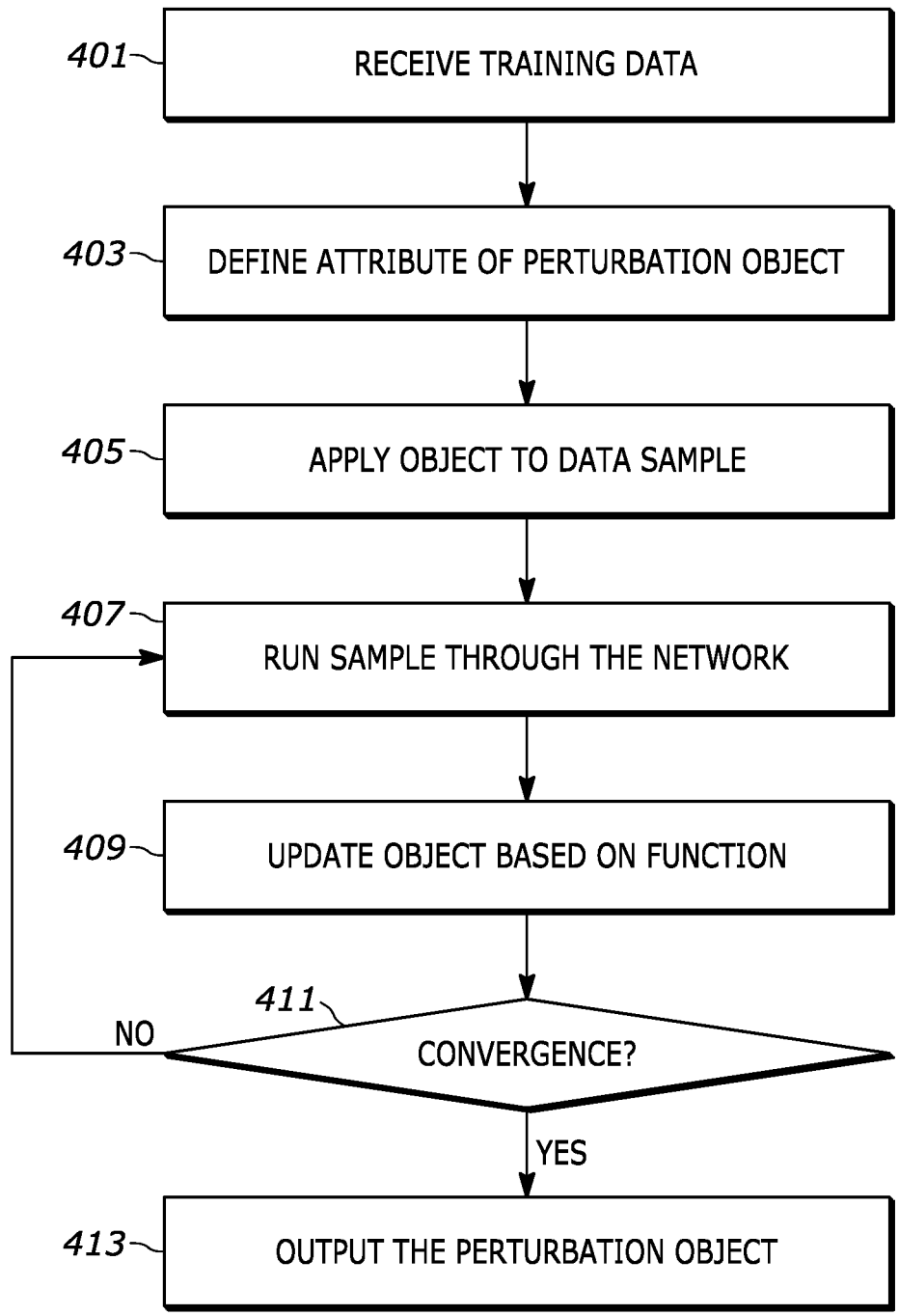
FIG. 4A is an example of a machine learning system that may print a perturbation object based on training data.

FIG. 4A is an example of a machine learning system that may print a perturbation object based on training data. At step 401, the system may receive a training data {X,Y} from one or more sensors. For example, the training data may be derived from both a lidar sensor and a camera. Thus, the lidar sensors can be utilized to identify a shape and the camera to identify an image associated with the input. At step 403, the system may define the shape, dimension, aspect of the object, such as circle/square/rectangle image patch, or spherical mesh with color overlay for 3D object with maximal speaker volume, or other physical properties of object. The system may define the range of transformation that is applicable to real signal acquisition as well as the target class of object y*, apply function of the object, and the set of observation functions of the signal.

At step 405, the system may train the perturbation object. The system may select a batch of B samples {$X_b, Y_b$} from {X,Y}. For each sample {x,y}∈{$X_b, Y_b$}, if y=y*, the system may apply the randomly-transformed perturbation object δ onto it, and then run the perturbed sample through randomly-picked observation function, then run this sample through $f_\theta$ at step 407. The system may update the perturbation object δ with $$-\frac{\partial f_\theta}{\partial \delta}$$

at step 409. For example, the perturbation object may be utilized to be ran through the ML model for training, adjustments to how the perturbation object is designed may change through each iteration to achieve maximized training and mitigating loss utilizing the object. Once the function converges, the system and network may have a final perturbation object or model. Such an update can be done with fixed step size, or with commonly used optimizer. Sample the next batch and repeat step 1-3, until loss function of $f_\theta$ converges. Thus at decision 411, the system may determine if the model has reached or approached convergence. At step 413, the system may then output or print (2-D or 3-D) article out of the object δ. Such δ can now be placed on any object of the target class y*. Thus, in one example, the object δ may be a patch or bar code (e.g., a 2 dimensional object) that can be placed on a vehicle. Thus, the 2-dimensional object may be beneficial for system that utilizes a camera as modal for classification. The object δ may also be integrated into the target or may be placed on as an after market component. In another sample, the object δ may be a 3-dimensional object.

Figure 4B:
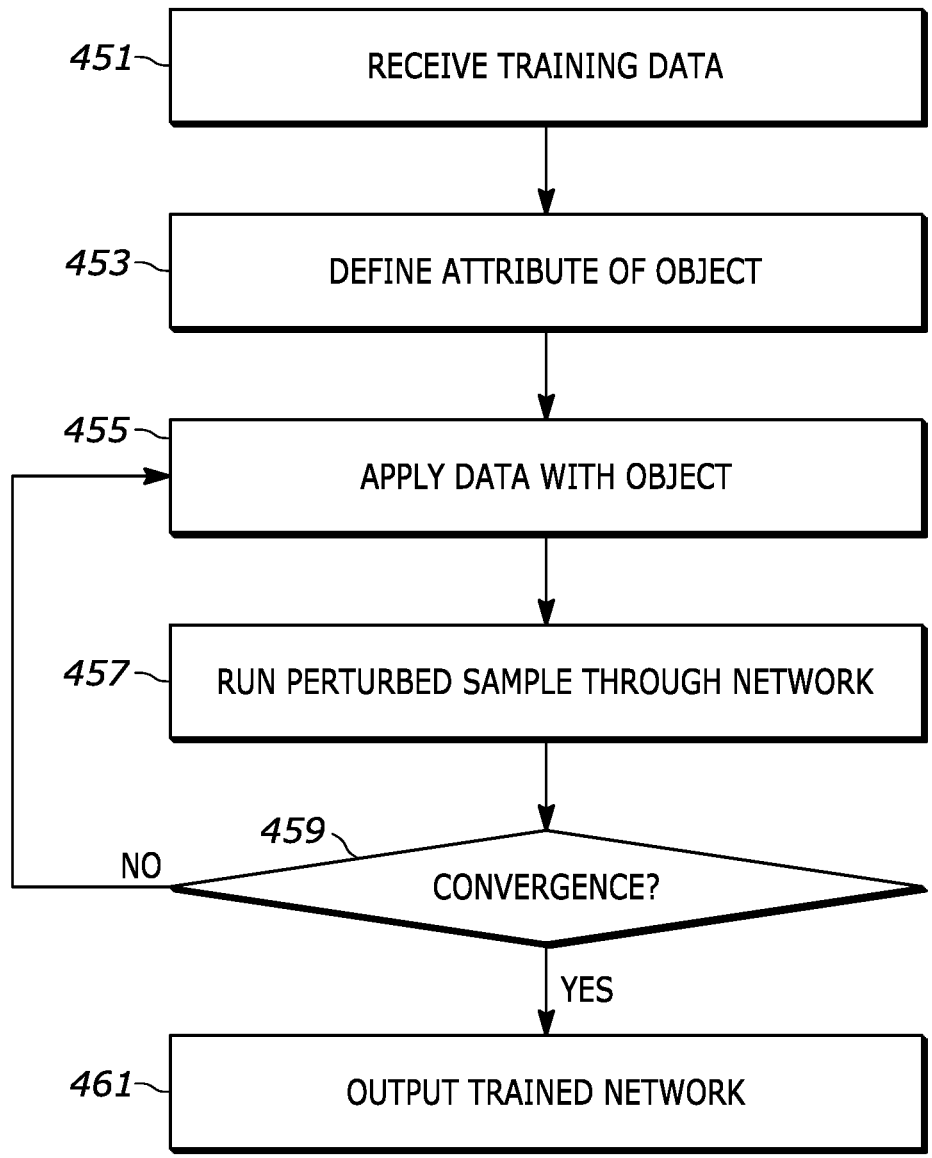
FIG. 4B is an example of a machine learning system that may utilize a perturbation object to train input data

FIG. 4B is an example of a machine learning system that may utilize a perturbation object to train input data. Another approach of the disclosure may be to co-design the N-modal classifier/object detector $f_\theta$ with the perturbation object δ. At step 451, the system may receive the training data from collecting data from one or more sensors.

At step 453, the system may define the attribute of the object. The system may define the shape, dimension, aspect of the object, such as circle, square, rectangle image patch, or spherical mesh with color overlay for a 3D object with maximal speaker volume, or other physical properties of object. The system may define the range of transformation that is applicable to real signal acquisition as well as the target class of object y*, apply function of the object, and the set of observation functions of the signal.

At step 455, the system may then train the perturbation object. The system may select a batch of B samples {$X_b, Y_b$} from {X,Y}. For each sample {x, y}∈ {$X_b, Y_b$}, if y=y*, the system may apply the randomly-transformed perturbation object δ onto it, and then run the perturbed sample through randomly-picked observation function, then run this sample through $f_\theta$ at step 457. The system may the update δ with $$-\frac{\partial f_\theta}{\partial \delta}.$$

Thus, the system may update the perturbation object based on the machine learning model/method. As the data is being ran through the ML with the various pertrubation objects, the ML model may make adjustments. For example, the perturbation object is being utilized to be ran through the ML model for training, adjustments to how the perturbation object is designed may change through each iteration to achieve maximized training and mitigating loss utilizing the object. Once the function converges, the system and network may have a final perturbation object or model. Such update can be done with fixed step size, or with commonly used optimizer. Update θ with $$-\frac{\partial f_\theta}{\partial \theta}.$$

Such update can be done with fixed step size, or with commonly used optimizer. Sample the next batch and repeat step 1-3, until loss function of $f_\theta$ converges. Print (2-D or 3-D) out the object δ. Such δ can now be placed on any object of the target class y*. The system may utilize $f_\theta$ for object classification/detection. At decision 459, the system may determine if the network has approached or reached convergence. At step 461, the system may output a trained network. The trained network may be output and utilized as a trained network when the network establishes convergence and minimizes or mitigates any loss. This may occur at a certain point or based upon a defined threshold as the amount of convergence based on the factor of correct prediction.

The above two methods shown in FIGS. 4A and 4B that are utilized can be generalized to O, A, and T being any computational process and can be learned from data using machine learning models.

Figure 5:
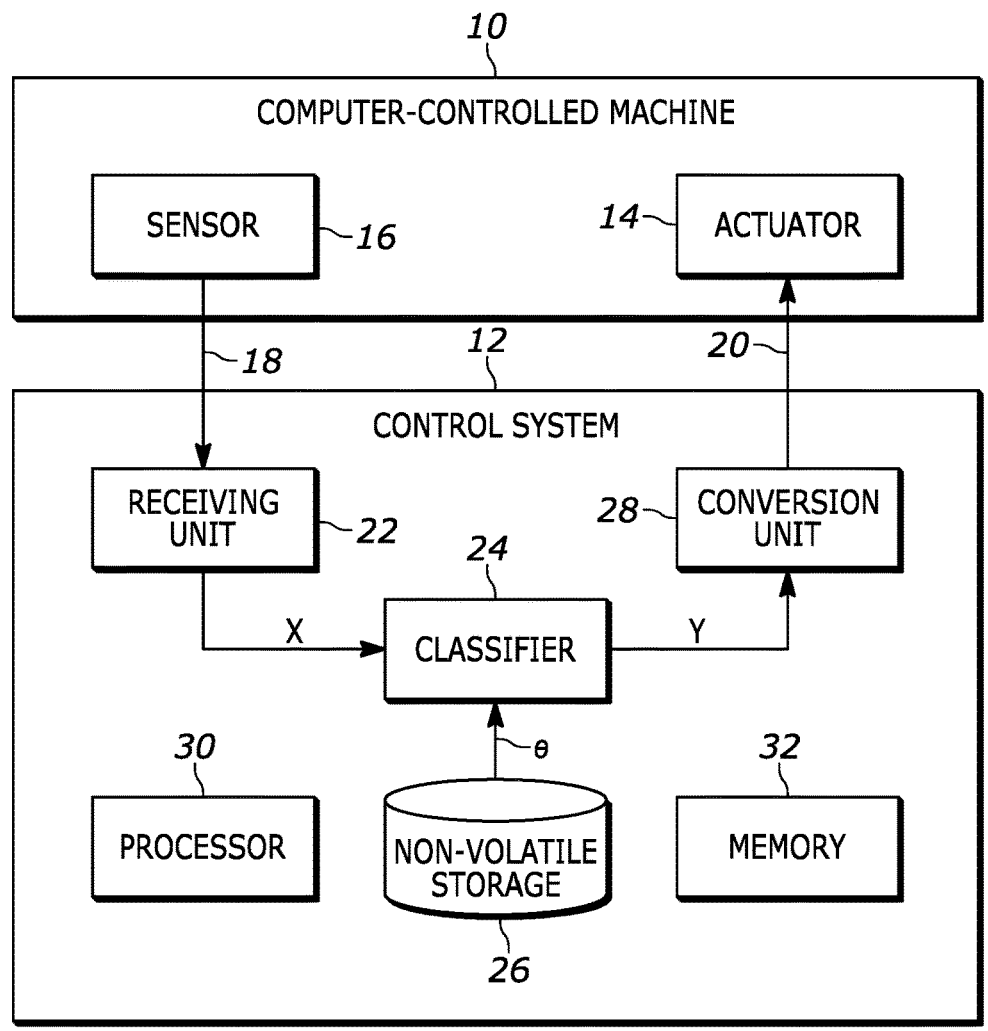
FIG. 5 depicts a schematic diagram of an interaction between computer-controlled machine 10 and control system 12.

FIG. 5 depicts a schematic diagram of an interaction between computer-controlled machine 10 and control system 12. The computer-controlled machine 10 may include a neural network as described in FIGS. 1-4. The computer-controlled machine 10 includes actuator 14 and sensor 16. Actuator 14 may include one or more actuators and sensor 16 may include one or more sensors. Sensor 16 is configured to sense a condition of computer-controlled machine 10. Sensor 16 may be configured to encode the sensed condition into sensor signals 18 and to transmit sensor signals 18 to control system 12. Non-limiting examples of sensor 16 include video, radar, LiDAR, ultrasonic and motion sensors. In one embodiment, sensor 16 is an optical sensor configured to sense optical images of an environment proximate to computer-controlled machine 10.

Control system 12 is configured to receive sensor signals 18 from computer-controlled machine 10. As set forth below, control system 12 may be further configured to compute actuator control commands 20 depending on the sensor signals and to transmit actuator control commands 20 to actuator 14 of computer-controlled machine 10.

As shown in FIG. 5, control system 12 includes receiving unit 22. Receiving unit 22 may be configured to receive sensor signals 18 from sensor 16 and to transform sensor signals 18 into input signals x. In an alternative embodiment, sensor signals 18 are received directly as input signals x without receiving unit 22. Each input signal x may be a portion of each sensor signal 18. Receiving unit 22 may be configured to process each sensor signal 18 to product each input signal x. Input signal x may include data corresponding to an image recorded by sensor 16.

Control system 12 includes classifier 24. Classifier 24 may be configured to classify input signals x into one or more labels using a machine learning (ML) algorithm, such as a neural network described above. Classifier 24 is configured to be parametrized by parameters, such as those described above (e.g., parameter $\theta$). Parameters $\theta$ may be stored in and provided by non-volatile storage 26. Classifier 24 is configured to determine output signals y from input signals x. Each output signal y includes information that assigns one or more labels to each input signal x. Classifier 24 may transmit output signals y to conversion unit 28. Conversion unit 28 is configured to covert output signals y into actuator control commands 20. Control system 12 is configured to transmit actuator control commands 20 to actuator 14, which is configured to actuate computer-controlled machine 10 in response to actuator control commands 20. In another embodiment, actuator 14 is configured to actuate computer-controlled machine 10 based directly on output signals y.

Upon receipt of actuator control commands 20 by actuator 14, actuator 14 is configured to execute an action corresponding to the related actuator control command 20. Actuator 14 may include a control logic configured to transform actuator control commands 20 into a second actuator control command, which is utilized to control actuator 14. In one or more embodiments, actuator control commands 20 may be utilized to control a display instead of or in addition to an actuator.

In another embodiment, control system 12 includes sensor 16 instead of or in addition to computer-controlled machine 10 including sensor 16. Control system 12 may also include actuator 14 instead of or in addition to computer-controlled machine 10 including actuator 14.

As shown in FIG. 5, control system 12 also includes processor 30 and memory 32. Processor 30 may include one or more processors. Memory 32 may include one or more memory devices. The classifier 24 (e.g., ML algorithms) of one or more embodiments may be implemented by control system 12, which includes non-volatile storage 26, processor 30 and memory 32.

Non-volatile storage 26 may include one or more persistent data storage devices such as a hard drive, optical drive, tape drive, non-volatile solid-state device, cloud storage or any other device capable of persistently storing information. Processor 30 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 32. Memory 32 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 30 may be configured to read into memory 32 and execute computer-executable instructions residing in non-volatile storage 26 and embodying one or more ML algorithms and/or methodologies of one or more embodiments. Non-volatile storage 26 may include one or more operating systems and applications. Non-volatile storage 26 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 30, the computer-executable instructions of non-volatile storage 26 may cause control system 12 to implement one or more of the ML algorithms and/or methodologies as disclosed herein. Non-volatile storage 26 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
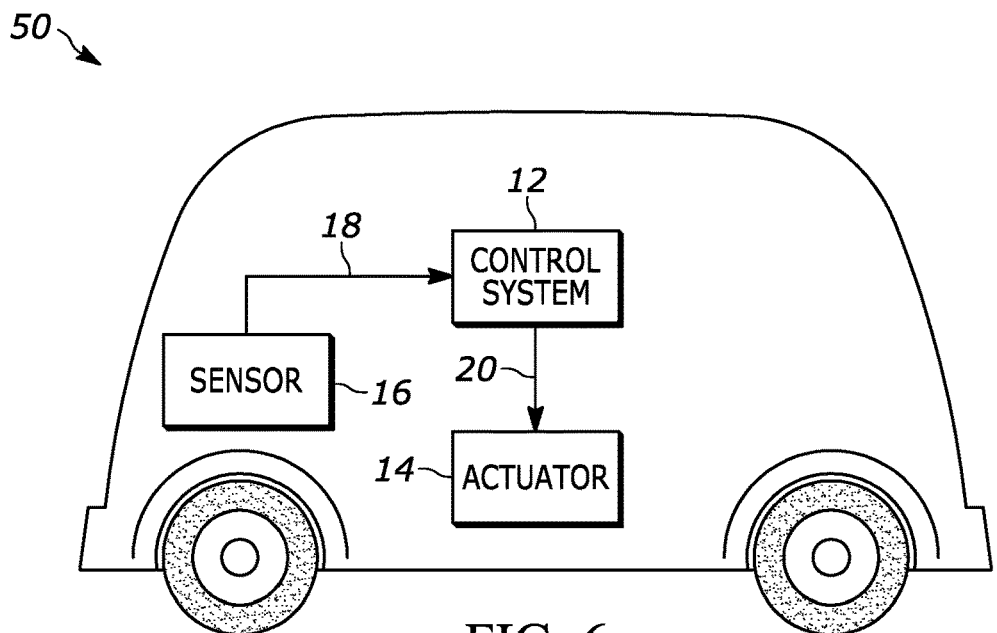
FIG. 6 depicts a schematic diagram of the control system of FIG. 1 configured to control a vehicle, which may be a partially autonomous vehicle or a partially autonomous robot.

FIG. 6 depicts a schematic diagram of control system 12 configured to control vehicle 50, which may be an at least partially autonomous vehicle or an at least partially autonomous robot. As shown in FIG. 5, vehicle 50 includes actuator 14 and sensor 16. Sensor 16 may include one or more video sensors, radar sensors, ultrasonic sensors, LiDAR sensors, and/or position sensors (e.g. GPS). One or more of the one or more specific sensors may be integrated into vehicle 50. Alternatively or in addition to one or more specific sensors identified above, sensor 16 may include a software module configured to, upon execution, determine a state of actuator 14. One non-limiting example of a software module includes a weather information software module configured to determine a present or future state of the weather proximate vehicle 50 or other location.

Classifier 24 of control system 12 of vehicle 50 may be configured to detect objects in the vicinity of vehicle 50 dependent on input signals x. In one example, a perturbation object may be embedded onto the vehicle (e.g., painted on the vehicle or added in manufacturing) or later added to help a classifier 24 identify the vehicle in non-optimal conditions. In such an embodiment, output signal y may include information characterizing the vicinity of objects to vehicle 50. Actuator control command 20 may be determined in accordance with this information. The actuator control command 20 may be used to avoid collisions with the detected objects.

In embodiments where vehicle 50 is an at least partially autonomous vehicle, actuator 14 may be embodied in a brake, a propulsion system, an engine, a drivetrain, or a steering of vehicle 50. Actuator control commands 20 may be determined such that actuator 14 is controlled such that vehicle 50 avoids collisions with detected objects. Detected objects may also be classified according to what classifier 24 deems them most likely to be, such as pedestrians or trees. Furthermore, the classifier 24 may utilize such perturbation objects to help identify items (e.g., other vehicles). The actuator control commands 20 may be determined depending on the classification. In a scenario where an adversarial attack may occur, the system described above may be further trained to better detect objects or identify a change in lighting conditions or an angle for a sensor or camera on vehicle 50.

In other embodiments where vehicle 50 is an at least partially autonomous robot, vehicle 50 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 20 may be determined such that a propulsion unit, steering unit and/or brake unit of the mobile robot may be controlled such that the mobile robot may avoid collisions with identified objects.

In another embodiment, vehicle 50 is an at least partially autonomous robot in the form of a gardening robot. In such embodiment, vehicle 50 may use an optical sensor as sensor 16 to determine a state of plants in an environment proximate vehicle 50. Actuator 14 may be a nozzle configured to spray chemicals. Depending on an identified species and/or an identified state of the plants, actuator control command 20 may be determined to cause actuator 14 to spray the plants with a suitable quantity of suitable chemicals.

Vehicle 50 may be an at least partially autonomous robot in the form of a domestic appliance. Non-limiting examples of domestic appliances include a washing machine, a stove, an oven, a microwave, or a dishwasher. In such a vehicle 50, sensor 16 may be an optical sensor configured to detect a state of an object which is to undergo processing by the household appliance. For example, in the case of the domestic appliance being a washing machine, sensor 16 may detect a state of the laundry inside the washing machine. Actuator control command 20 may be determined based on the detected state of the laundry.

Figure 7:
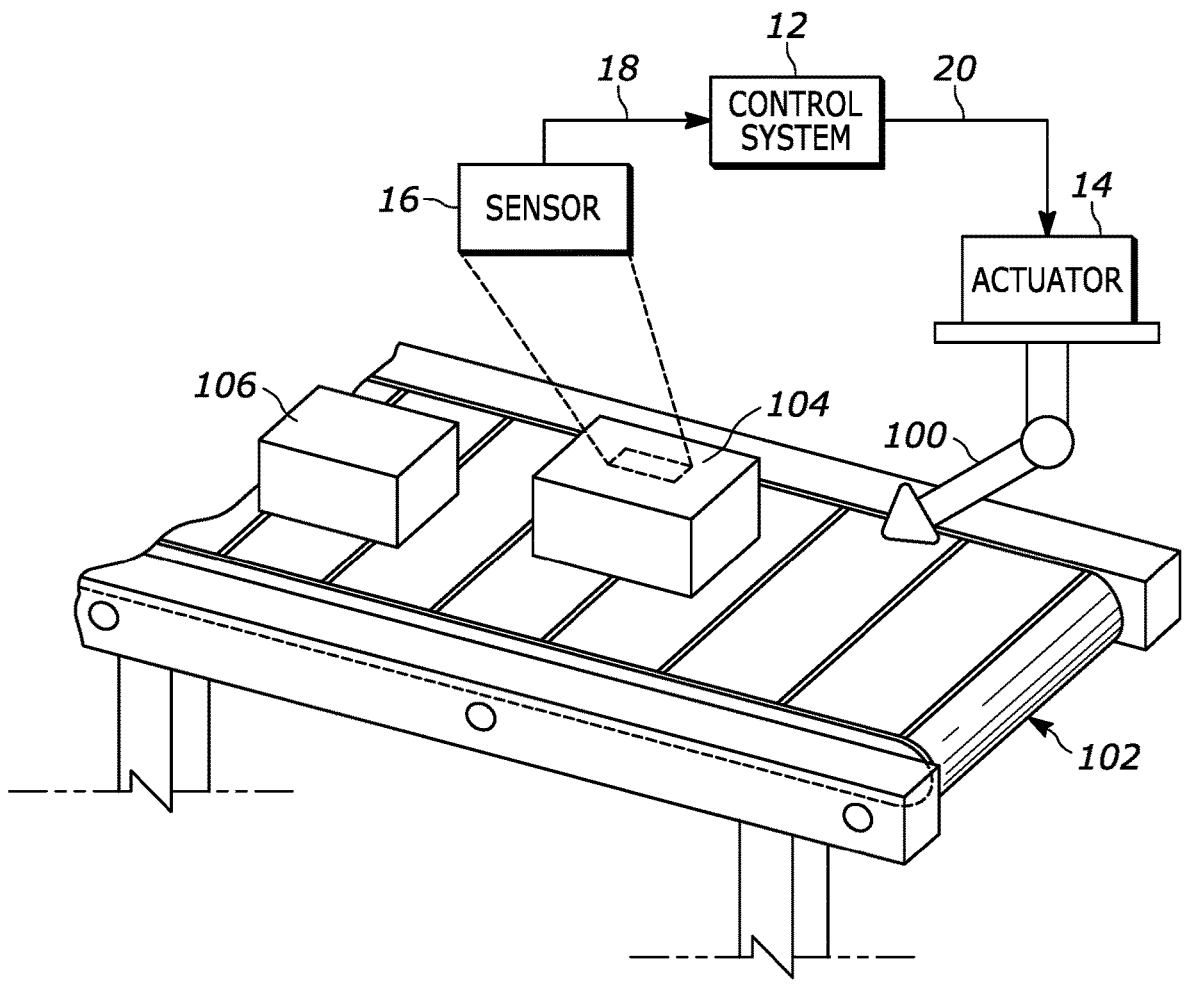
FIG. 7 depicts a schematic diagram of the control system of FIG. 1 configured to control a manufacturing machine, such as a punch cutter, a cutter or a gun drill, of manufacturing system, such as part of a production line.

FIG. 7 depicts a schematic diagram of control system 12 configured to control system 100 (e.g., manufacturing machine), such as a punch cutter, a cutter or a gun drill, of manufacturing system 102, such as part of a production line. Control system 12 may be configured to control actuator 14, which is configured to control system 100 (e.g., manufacturing machine).

Sensor 16 of system 100 (e.g., manufacturing machine) may be an optical sensor configured to capture one or more properties of manufactured product 104. Classifier 24 may be configured to determine a state of manufactured product 104 from one or more of the captured properties. The manufactured product 104 may include a perturbation object integrated in it or added on thereafter to help identify the type of product or state of the manufactured product. Actuator 14 may be configured to control system 100 (e.g., manufacturing machine) depending on the determined state of manufactured product 104 for a subsequent manufacturing step of manufactured product 104. The actuator 14 may be configured to control functions of system 100 (e.g., manufacturing machine) on subsequent manufactured product 106 of system 100 (e.g., manufacturing machine) depending on the determined state of manufactured product 104.

Figure 8:
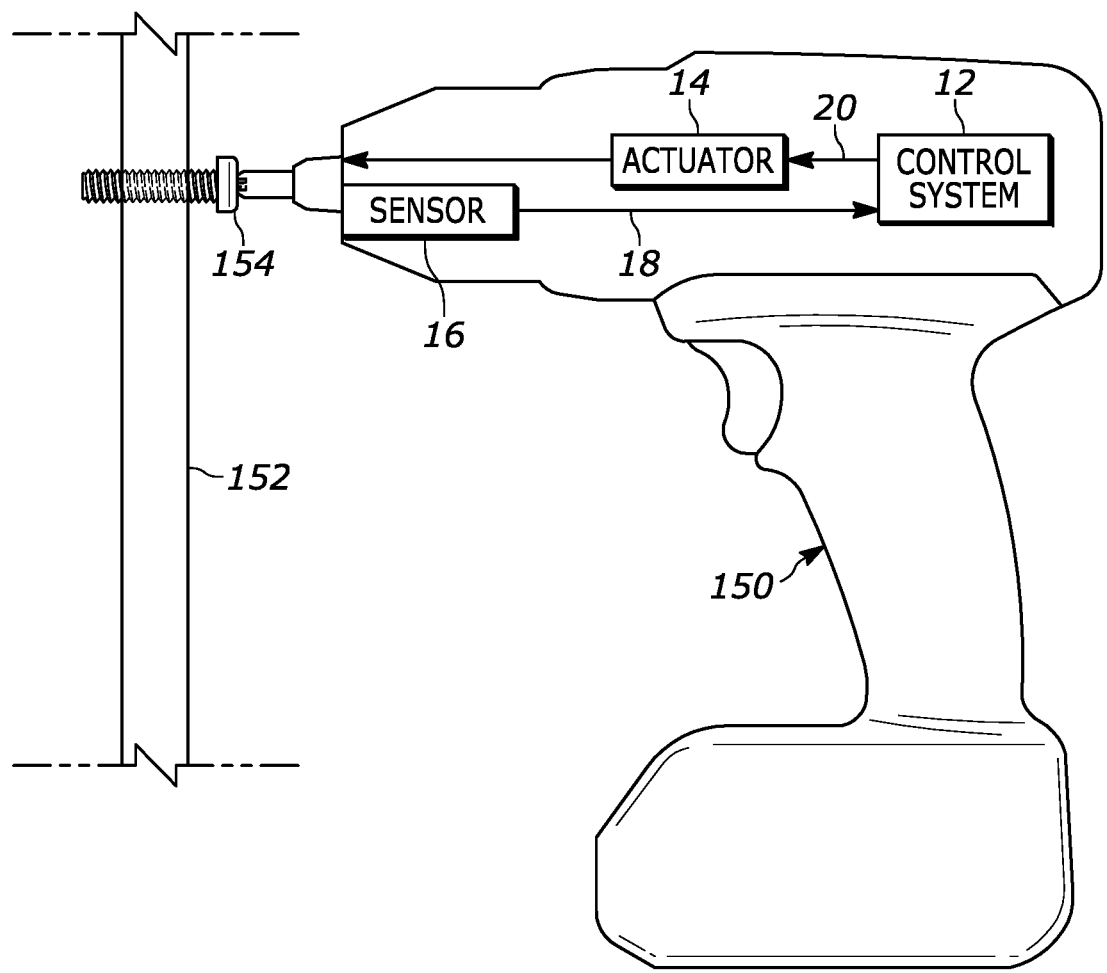
FIG. 8 depicts a schematic diagram of the control system of FIG. 1 configured to control a power tool, such as a power drill or driver, that has an at least partially autonomous mode.

FIG. 8 depicts a schematic diagram of control system 12 configured to control power tool 150, such as a power drill or driver, that has an at least partially autonomous mode. Control system 12 may be configured to control actuator 14, which is configured to control power tool 150.

Sensor 16 of power tool 150 may be an optical sensor configured to capture one or more properties of work surface 152 and/or fastener 154 being driven into work surface 152. Classifier 24 may be configured to determine a state of work surface 152 and/or fastener 154 relative to work surface 152 from one or more of the captured properties. A perturbation object may be placed on work surface 152 to help identify a state of the work surface or the type of work surface utilized. The state may be fastener 154 being flush with work surface 152. The state may alternatively be hardness of work surface 152. Actuator 14 may be configured to control power tool 150 such that the driving function of power tool 150 is adjusted depending on the determined state of fastener 154 relative to work surface 152 or one or more captured properties of work surface 152. For example, actuator 14 may discontinue the driving function if the state of fastener 154 is flush relative to work surface 152. As another non-limiting example, actuator 14 may apply additional or less torque depending on the hardness of work surface 152.

Figure 9:
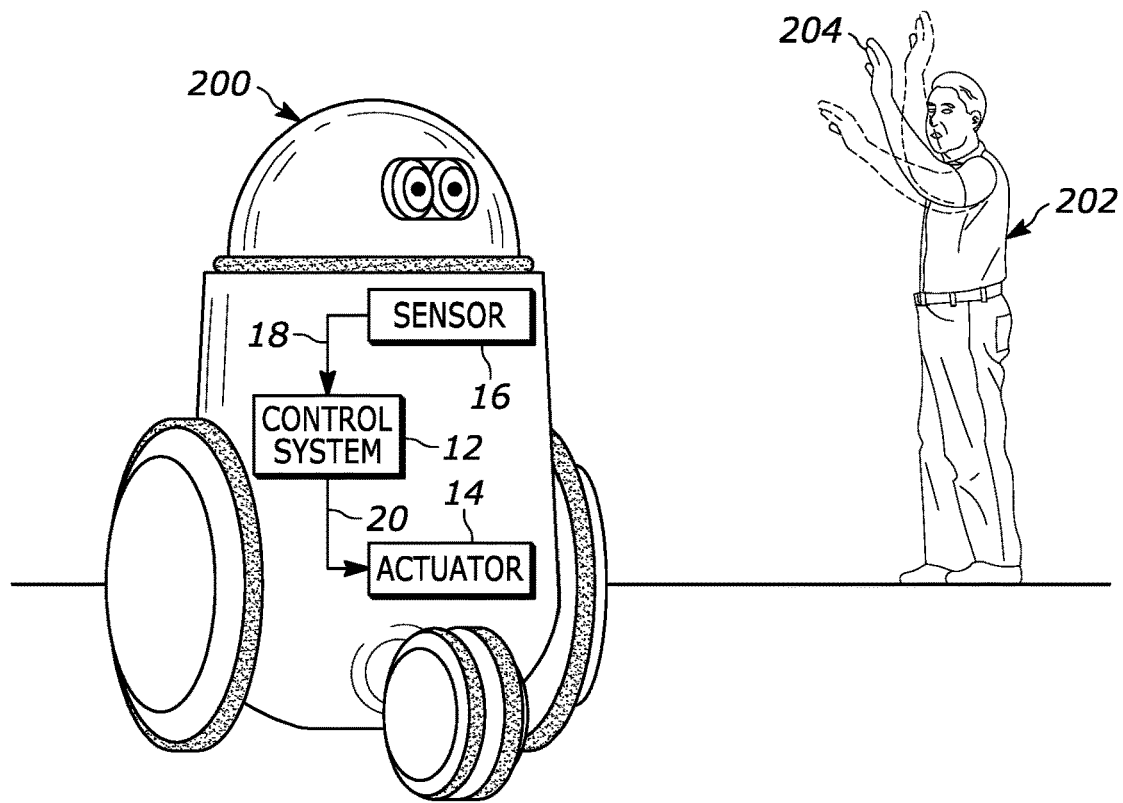
FIG. 9 depicts a schematic diagram of the control system of FIG. 1 configured to control an automated personal assistant.

FIG. 9 depicts a schematic diagram of control system 12 configured to control automated personal assistant 900. Control system 12 may be configured to control actuator 14, which is configured to control automated personal assistant 900. Automated personal assistant 900 may be configured to control a domestic appliance, such as a washing machine, a stove, an oven, a microwave or a dishwasher.

Sensor 16 may be an optical sensor and/or an audio sensor. The optical sensor may be configured to receive video images of gestures 904 of user 902. The audio sensor may be configured to receive a voice command of user 902.

Control system 12 of automated personal assistant 900 may be configured to determine actuator control commands 20 configured to control system 12. Control system 12 may be configured to determine actuator control commands 20 in accordance with sensor signals 18 of sensor 16. Automated personal assistant 900 is configured to transmit sensor signals 18 to control system 12. Classifier 24 of control system 12 may be configured to execute a gesture recognition algorithm to identify gesture 904 made by user 902, to determine actuator control commands 20, and to transmit the actuator control commands 20 to actuator 14. A perturbation object may be utilized to identify certain types of gestures 904 or type of user 902 based on a perturbation object placed on the user. Classifier 24 may be configured to retrieve information from non-volatile storage in response to gesture 904 (or additionally the perturbation object) and to output the retrieved information in a form suitable for reception by user 902.

Figure 10:
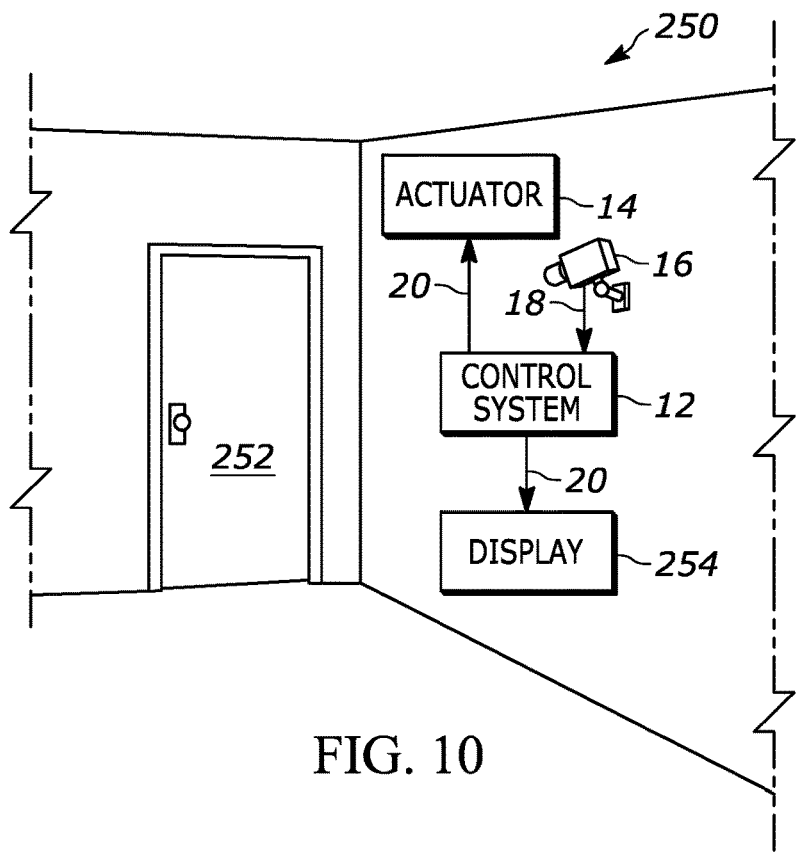
FIG. 10 depicts a schematic diagram of the control system of FIG. 1 configured to control a monitoring system, such as a control access system or a surveillance system.

FIG. 10 depicts a schematic diagram of control system 12 configured to control monitoring system 250. Monitoring system 250 may be configured to physically control access through door 252. Sensor 16 may be configured to detect a scene that is relevant in deciding whether access is granted. Sensor 16 may be an optical sensor configured to generate and transmit image and/or video data. Such data may be used by control system 12 to detect a person's face.

Classifier 24 of control system 12 of monitoring system 250 may be configured to interpret the image and/or video data by matching identities of known people stored in non-volatile storage 26, thereby determining an identity of a person. Classifier 24 may be configured to generate and an actuator control command 20 in response to the interpretation of the image and/or video data. Control system 12 is configured to transmit the actuator control command 20 to actuator 14. In this embodiment, actuator 14 may be configured to lock or unlock door 252 in response to the actuator control command 20. In other embodiments, a non-physical, logical access control is also possible.

Monitoring system 250 may also be a surveillance system. In such an embodiment, sensor 16 may be an optical sensor configured to detect a scene that is under surveillance and control system 12 is configured to control display 254. Classifier 24 is configured to determine a classification of a scene, e.g. whether the scene detected by sensor 16 is suspicious. A perturbation object may be utilized for detecting certain types of objects to allow the system to identify such objects in non-optimal conditions (e.g., night, fog, rainy, etc.). Control system 12 is configured to transmit an actuator control command 20 to display 254 in response to the classification. Display 254 may be configured to adjust the displayed content in response to the actuator control command 20. For instance, display 254 may highlight an object that is deemed suspicious by classifier 24.

Figure 11:
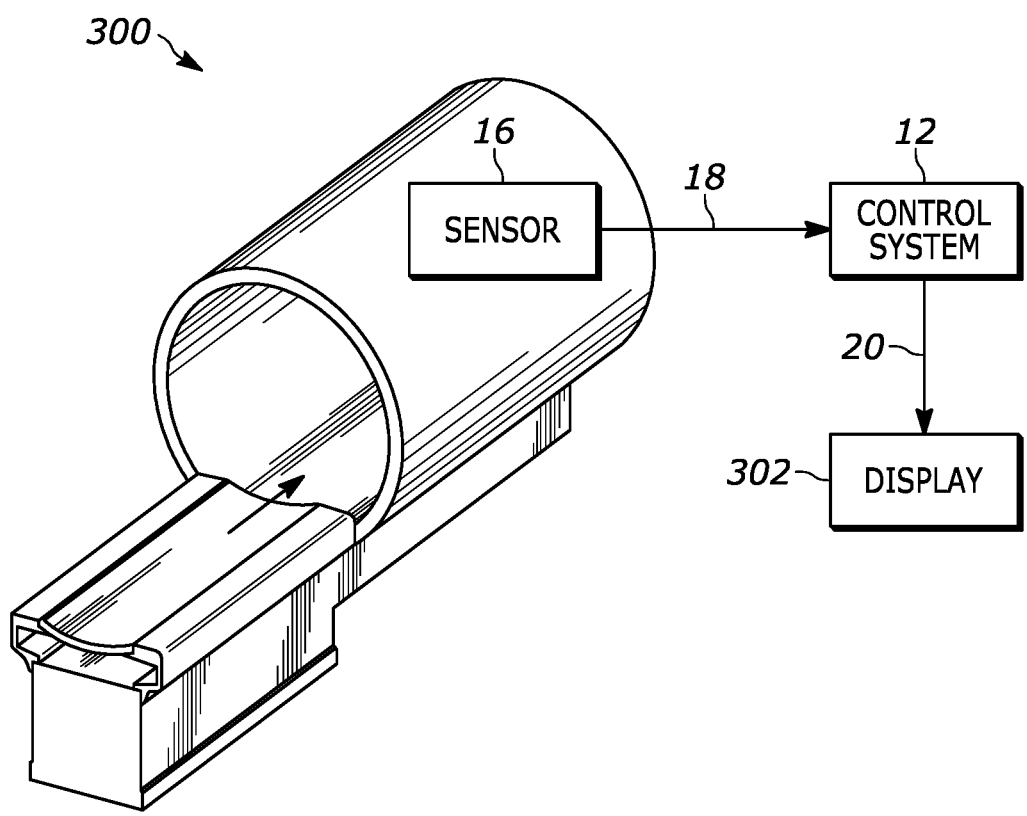
FIG. 11 depicts a schematic diagram of the control system of FIG. 1 configured to control an imaging system, for example an MRI apparatus, x-ray imaging apparatus or ultrasonic apparatus.

FIG. 11 depicts a schematic diagram of control system 12 configured to control imaging system 1100, for example an MRI apparatus, x-ray imaging apparatus or ultrasonic apparatus. Sensor 16 may, for example, be an imaging sensor. Classifier 24 may be configured to determine a classification of all or part of the sensed image. Classifier 24 may be configured to determine or select an actuator control command 20 in response to the classification obtained by the trained neural network. For example, classifier 24 may interpret a region of a sensed image to be potentially anomalous. A perturbation object may be utilized to identify certain objects utilized in the imaging system, such as a medical device or medical equipment. In this case, actuator control command 20 may be determined or selected to cause display 302 to display the imaging and highlighting the potentially anomalous region.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for training a machine learning network, comprising:
   receiving an input data from one or more sensors, wherein the input data includes information indicative of image information or sound information, wherein the one or more sensors includes a camera, radar, sonar, or microphone;
   selecting one or more batch samples from the input data;
   applying a perturbation object onto the one or more batch samples to create a perturbed sample, wherein the perturbation object is utilized to aid in correct prediction of an object from the input data;
   during the training of the machine learning network using the perturbation object, running the perturbed sample through a loss function associated with the machine learning network to detect or classify the object utilizing the perturbed sample;
   iteratively updating the perturbation object in response to the loss function running the perturbed sample; and
   outputting the perturbation object in response to the loss function exceeding a convergence threshold wherein the exceeding of the convergence threshold indicates that misclassification of the object by the machine learning network has been minimized through the iteratively updating of the perturbation object and wherein the outputting of the perturbation object includes causing a system to print the updated perturbation object.

2. The computer-implemented method of claim 1, wherein the perturbation object is a two-dimensional image.

3. The computer-implemented method of claim 1, wherein the perturbation object is a three-dimensional object.

4. The computer-implemented method of claim 1, wherein outputting the perturbation object includes printing the perturbation object.

5. The computer-implemented method of claim 1, wherein the loss function associated with the machine learning network includes a multimodal classifier.

6. The computer-implemented method of claim 1, wherein the loss function associated with the machine learning network includes an object detector.

7. The computer-implemented method of claim 1, wherein the input data includes location information associated with a detected object.

8. A system including a machine learning network, comprising:
   an input interface configured to receive input data, wherein the input interface is connected to one or more sensors, wherein the one or more sensors includes a camera, radar, sonar, or microphone; and
   a processor, in communication with the input interface, wherein the processor is programmed to:
   receive the input data including information indicative of image information or sound information;
   select one or more batch samples from the input data;
   apply a perturbation object onto the one or more batch samples to create a perturbed sample, wherein the perturbation object is utilized to aid in a correct prediction of an object from the input data;
   during training of the machine learning network using the perturbation object, run the perturbed sample through a loss function associated with the machine learning network in order to detect or classify the perturbed sample; and
   iteratively update the perturbation object in response to the loss function associated with the machine learning network running the perturbed sample; and
   output the perturbation object in response to the loss function exceeding a convergence threshold wherein the exceeding of the convergence threshold indicates that misclassification of the object by the machine learning network has been minimized through the iteratively updating of the perturbation object and wherein the outputting of the perturbation object includes causing a device to print the updated perturbation object.

9. The system of claim 8, wherein the perturbation object is a two-dimensional image.

10. The system of claim 8, wherein the perturbation object is a three-dimensional object.

11. The system of claim 8, wherein outputting the perturbation object includes printing the perturbation object.

12. The system of claim 8, wherein the loss function includes an object detector.

13. The system of claim 8, wherein the input data includes location information associated with a detected object.

* * * * *